United States Patent
Marin

[19]

[11] Patent Number: 6,096,990
[45] Date of Patent: Aug. 1, 2000

[54] APPLIANCE SWITCH

[76] Inventor: Jorge Orlando Marin, 98 Neponset Ave., Boston, Mass. 02136

[21] Appl. No.: 09/038,591

[22] Filed: Mar. 11, 1998

[51] Int. Cl.[7] .................................................. H01H 13/52
[52] U.S. Cl. ........................... 200/535; 200/284; 200/295
[58] Field of Search ................................. 200/530, 532, 200/534, 535, 295, 296, 341, 345, 520, 284

[56] References Cited

U.S. PATENT DOCUMENTS

| | | | |
|---|---|---|---|
| 3,119,909 | 1/1964 | Cutler ........................................ | 200/295 |
| 3,437,772 | 4/1969 | Piber ......................................... | 200/284 |
| 3,916,131 | 10/1975 | Golbeck et al. .......................... | 200/535 |
| 3,924,090 | 12/1975 | Chao et al. ............................... | 200/535 |
| 4,316,066 | 2/1982 | Muller et al. ............................ | 200/462 |
| 4,673,778 | 6/1987 | Lewandowski et al. ........... | 200/284 X |
| 4,758,699 | 7/1988 | Ciriscioli ................................... | 200/530 |
| 4,887,976 | 12/1989 | Bennett et al. .......................... | 439/492 |
| 4,985,603 | 1/1991 | Prince ....................................... | 200/341 |
| 4,985,699 | 1/1991 | Prince ....................................... | 200/341 |
| 5,601,183 | 2/1997 | Boyd et al. ............................... | 200/553 |

*Primary Examiner*—Renee Luebke

[57] ABSTRACT

A cheaply assemblable appliance switch has a housing with walls defining a cavity opening rearward and an aperture forward in which an actuator is captured. Mid portions of terminal pieces which are wider than inner portions are affixed in the housing in slots with retaining lips spaced apart by more than the width of inner portions of the electrodes.

2 Claims, 4 Drawing Sheets

APPLIANCE SWITCH

BRIEF SUMMARY OF THE INVENTION

This invention relates to switches for use in appliances such as clothes washing machines and dryers. The switch design minimizes the costs of materials and assembly

DETAILED DESCRIPTION

Figure 1:
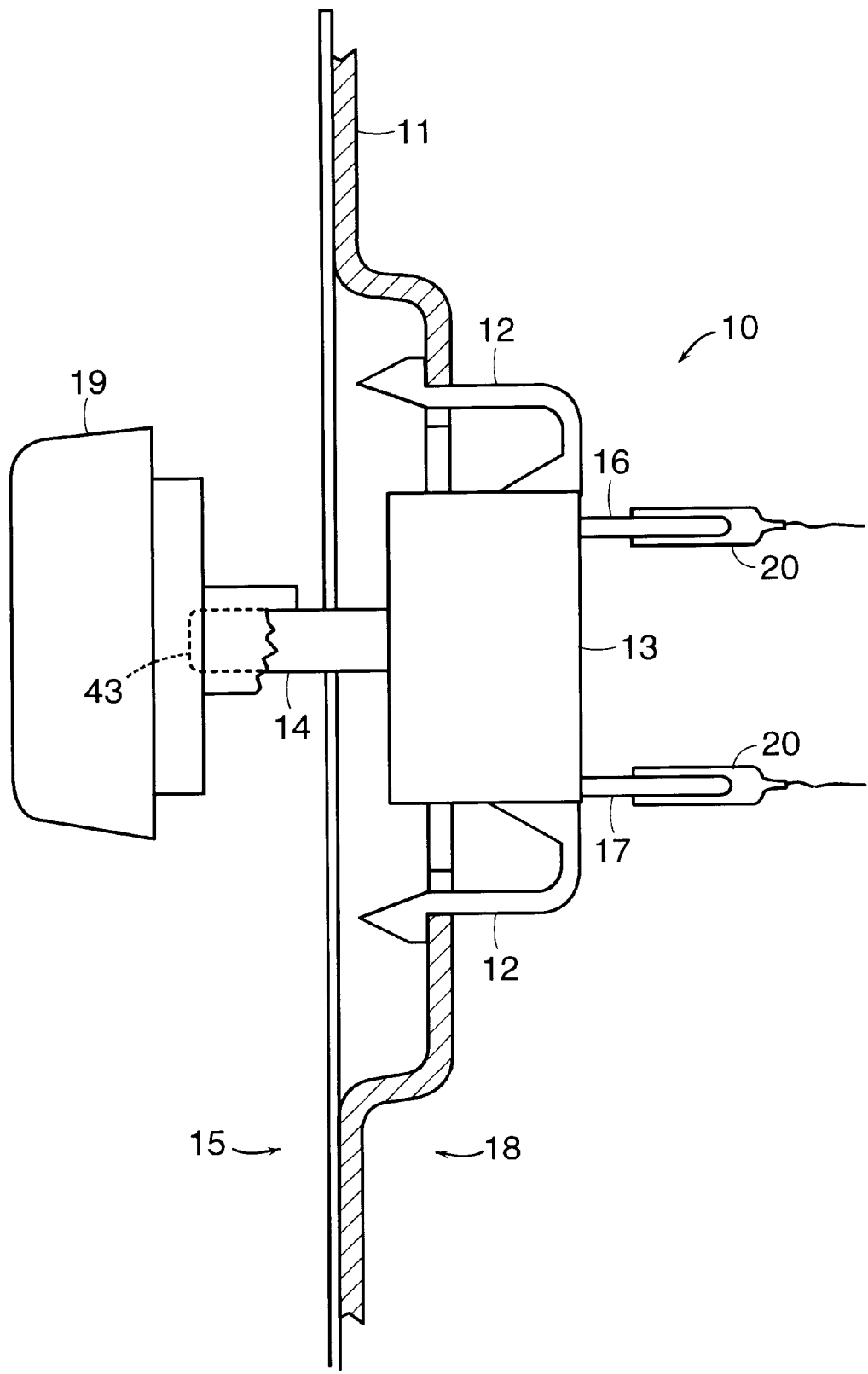
FIG. 1 shows a switch according to the invention installed on a front panel of an appliance.

The invention may be described with reference to the drawings. Switching machine 10 according to the invention includes housing 13 affixed to control panel 11 of an appliance with panel engagement snaps 12. Actuator 14 extends frontward from front 15 of panel 11, and first terminal piece 16 and second terminal piece 17 extend rearward from rear 18 of panel 11. Actuator 14 is fitted with a finger button 19 which receives a finger force from an operator and transmits it to actuator 14. Terminal pieces 17 and 16 are shaped to attach to spade connectors 20, which connect switch 10 to operating circuitry of the appliance.

Figure 2:
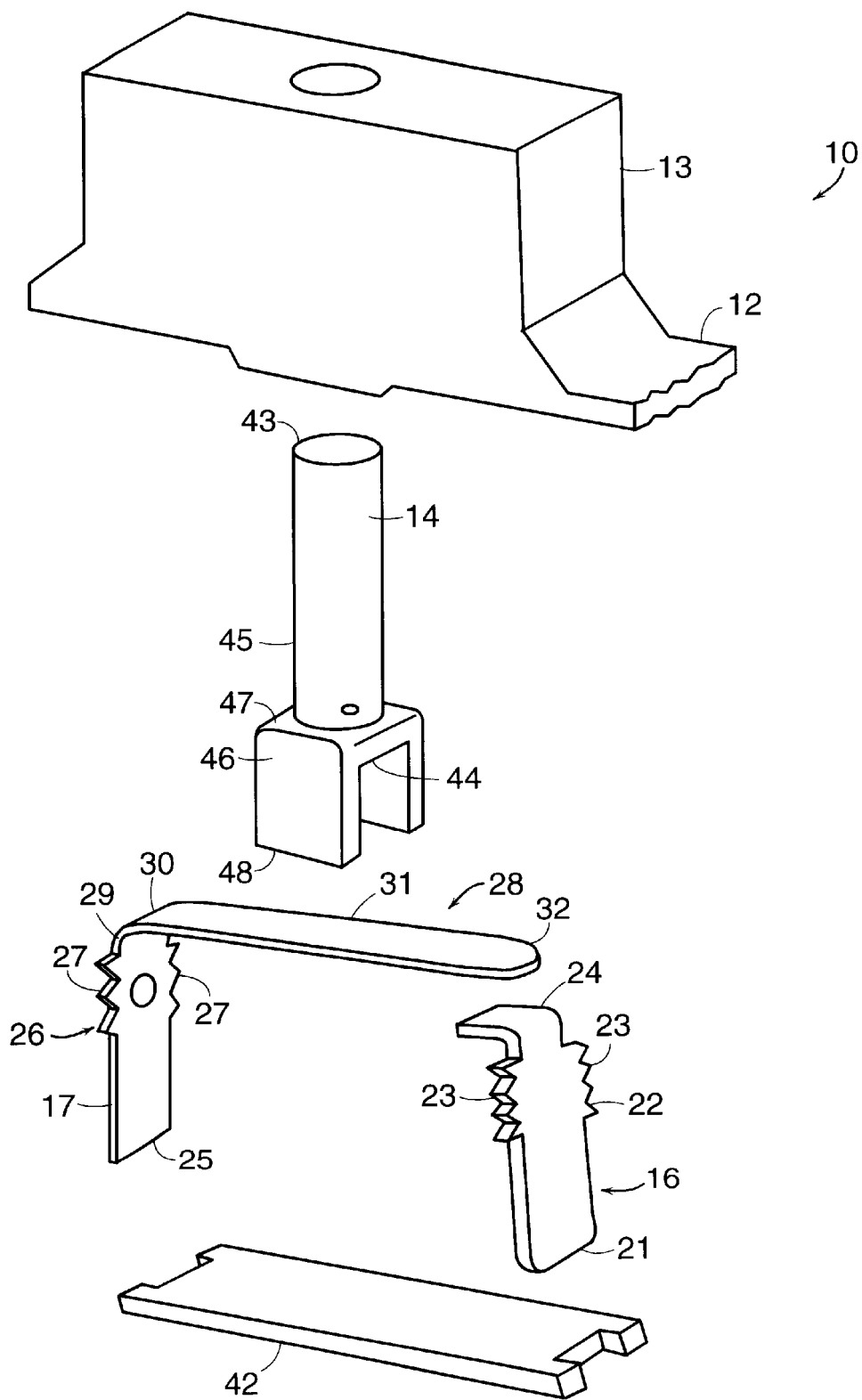
FIG. 2 shows an exploded diagram of the switch of FIG. 1.
Figure 3:
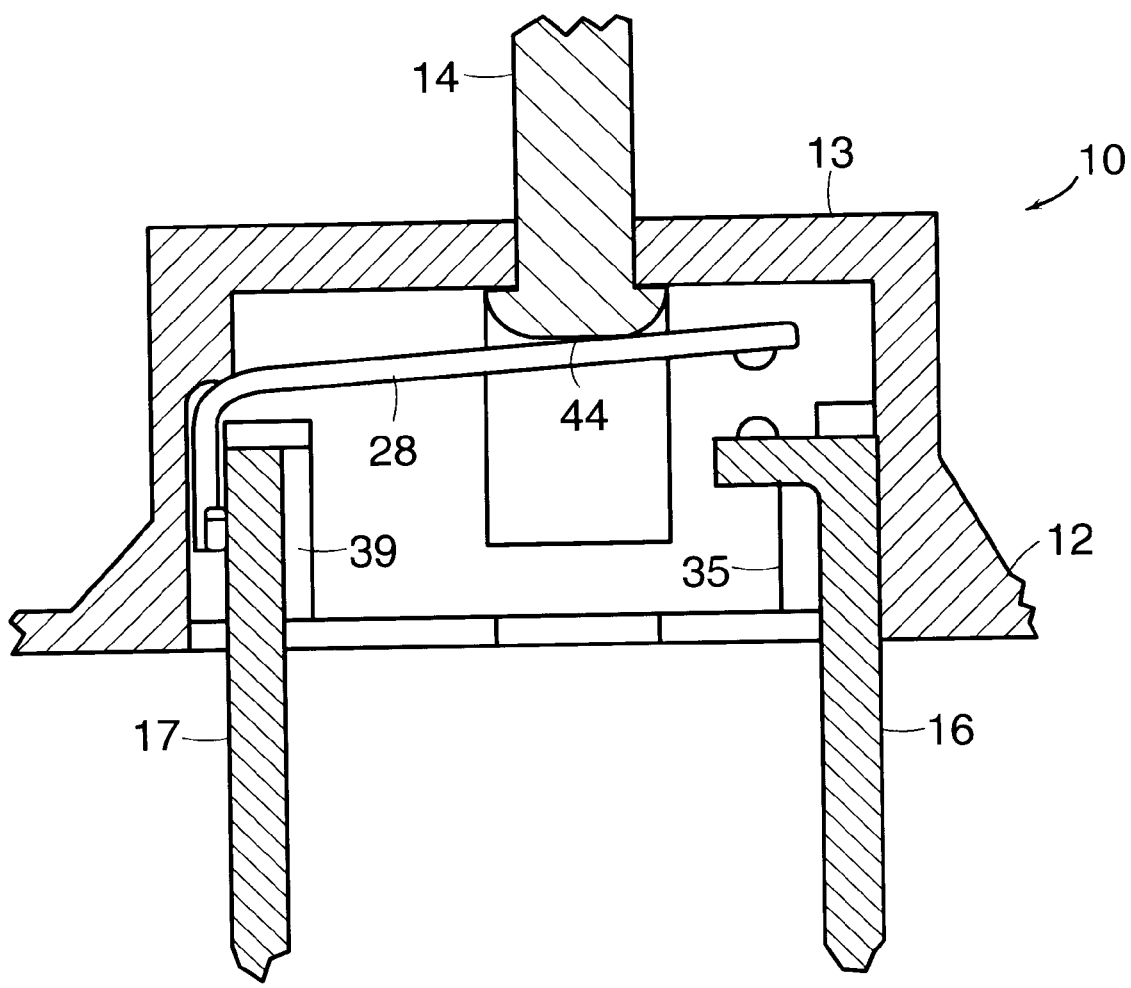
FIG. 3 shows a cross-sectional view of the switch of FIG. 1.
Figure 4:
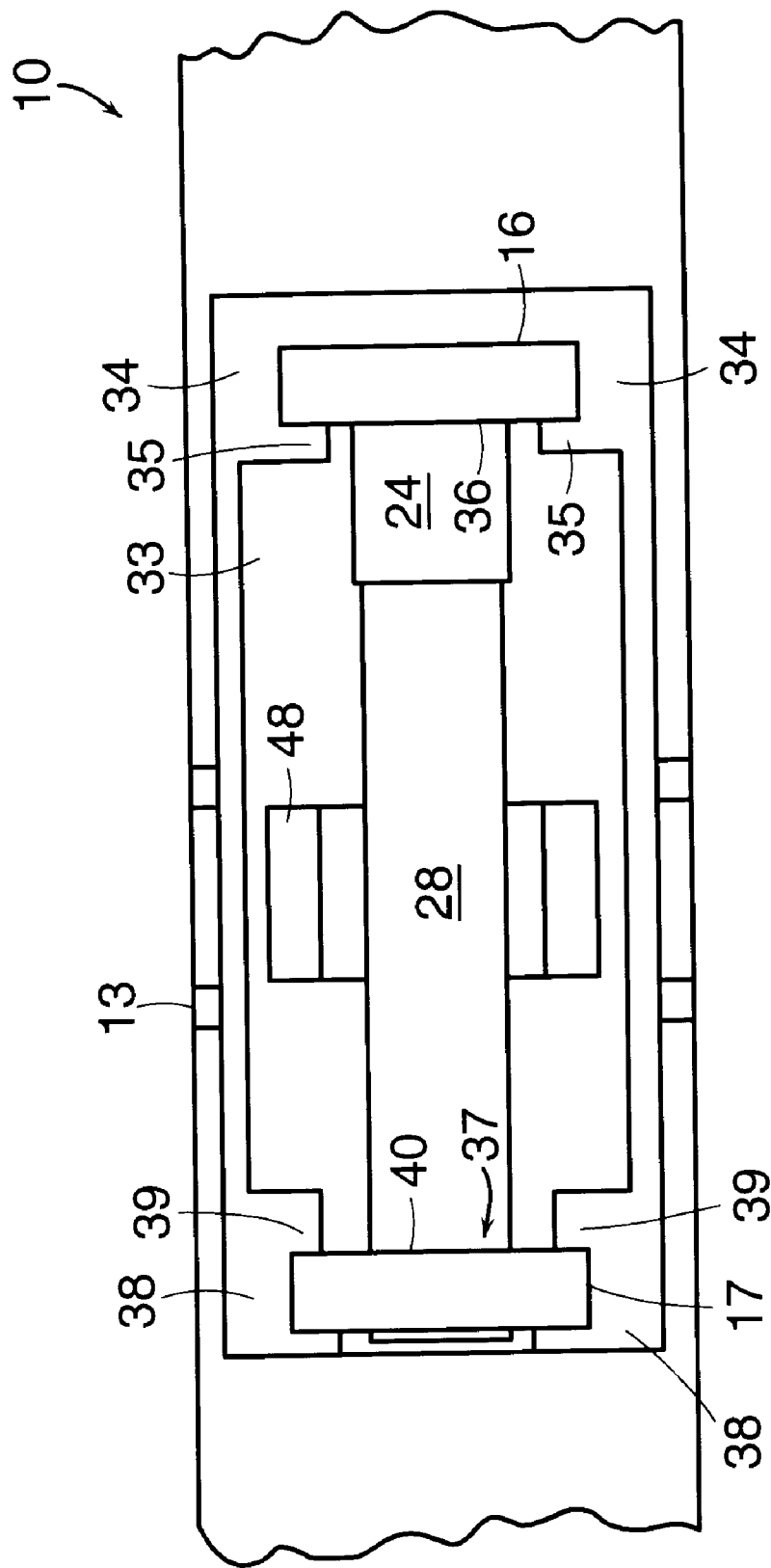
FIG. 4 shows a view of the back of the switch of FIG. 1 with the back cover removed.

As shown more particularly in FIGS. 2, 3, and 4, first terminal piece 16 is made of brass strip with an outer portion 21 shaped to receive a spade connector or other electrical connector, a middle portion 22 with toothed edges 23, and an inner end portion 24 bent at right angles to middle portion 22. The width of inner end portion 24 is less than that of middle portion 22.

Second terminal piece 17 is made of brass strip with an outer portion 25 shaped to receive a spade connector or other electrical connector and inner portion 26 with toothed edges 27.

Spring connector 28 is made of springy conductive strip. Affixed in 29 of spring connector 28 is affixed to inner portion 26 of second terminal 17, bin 30 extends portion 31 of the spring connector in a direction nearly at right angles to a fixed end 29 and places free in 32 in a position opposed to inner end portion 24.

Housing 13 is made of non-conductive polymeric material. First terminal piece 16 is lodged in first slot structure 33 of housing 13. First slot structure 33 includes edge engagement portions 34 engaging middle portion 22 of first terminal piece 16 and two retaining lips 35 engaging inward face 36 of first terminal piece 16. The space between retaining lips 35 is less than the width of middle portion 22 of first terminal piece 16 and greater than the width of inner end portion 24 of first terminal piece 16.

Second terminal piece 17 is lodged in second slot structure 37 of housing 13. Second slot structure 37 includes edge engagement portions 38 engaging said inner portion 26 of second terminal piece 17 and two retaining lips 39 engaging inward face 40 of second terminal piece 17. The space between retaining lips 39 is less than the width of inner portion 26 of second terminal piece 17 and greater than the width of spring connector 28. Back cover 42 may be secured to housing 12 by well known methods.

Actuator 14 has a portion 43 for receiving a force applied by an operator and an actuation portion 44 engaging spring connector 28 and transmitting thereto a force applied by an operator. Surfaces 45 and 46 engage with housing 13 to constrain actuator 14 from rotating while permitting it to move frontwards and rearward. Surface 47 engages housing 13 to limit motion of actuator in the forward direction, and surface 48 engages back cover 42 to limit motion of actuator 14 in the rearward direction.

The operation of the switch is as follows. The spring connector is initially in contact with the actuator biasing it forward against the housing, and opening a gap between the end of the spring connector and the end of the first terminal piece. When an operator pushes the button 19, the actuator moves rearward and pushes the spring connector so that it flexes to put its free end into contact with the end of terminal piece 16, thereby closing the electrical circuit. If the operator pushes hard enough the actuator hits the back cover and is reversed and the circuit is opened.

The forces, deflection, and stresses on the spring connector depend on its elastic properties and dimensions. Advantageous operation is achieved if the spring connector is made of beryllium-copper alloy No. 17410 with a thickness of 0.015 in., a width of 0.23 in., a span pivot-to-electrical contact point 1.3 in., and a span pivot-to-actuator pressure point 0.65 in.

What is claimed is:

1. A machine for attachment to a control panel of an appliance having a front and a rear, said machine for switching electric current by an operator positioned at the front of the appliance, said machine having two states in one of which a circuit is open and in the other of which a circuit is closed, said machine comprising a housing, a first terminal piece, a second terminal piece, a spring connector, and an actuator, said housing having an attachment mechanism for affixing said housing to a front panel of an appliance and having walls generally defining a cavity opening to rearward, and an aperture on a forward side through which said actuator passes, said actuator including
a portion for receiving an actuating force from an operator,
an actuation portion engaging said spring connector, and
constraining portions which engage said housing so as to permit said actuator to move frontward and rearward while limiting its frontward motion, said first terminal piece being made of brass strip with an outer portion shaped to receive an electrical connector, a middle portion with toothed edges, and an inner end portion bent at right angles to and having a width less than said middle portion, said second terminal piece being made of brass strip with an outer portion shaped to receive an electrical connector, and an inner portion with a width and toothed edges, said spring connector being an elongated strip with a width made of a springy electrically conductive material, and spring connector having an affixed end affixed to said second terminal piece and a free end, said spring connector having a bend so that a portion adjacent to said free end extends in a direction at nearly right angles to the plane of the end affixed to the second terminal piece, said housing including structure defining a first slot structure in which said first terminal piece is lodged, said first slot structure having edge engagement portions engaging said toothed edges of said middle portion of said first terminal piece and two retaining lips engaging an inward face of said first terminal piece along edges thereof and being spaced apart by a distance less than the width of said middle portion of said first terminal piece and greater than the width of said inner end portion of said first terminal piece, structure defining a second slot structure in which said second terminal piece is lodged, said second slot structure having edge engagement portions engaging the toothed edges of said inner portion of said second terminal piece and two retaining lips engaging an inward face of said second terminal piece along edges thereof and being spaced apart by a distance less than the width of said inner portion of said second terminal piece and greater than the width of said spring connector, said housing, actuator, first terminal piece, second terminal piece, and spring connector being arranged and constructed so that the free end of the spring connector is opposed to the inner portion of the first terminal piece, so that said spring connector always engages and biases said actuator forward, and so that when the actuator is moved rearward the state of the said machine is changed.

2. a machine as claimed in claim 1 wherein said spring connector is made of beryllium-copper alloy 17410, and has a thickness of 0.015 in., a width of 0.23 in., a span from said second terminal piece to its free end of 1.3 in., and a span from said second terminal piece to a point touching said actuator of 0.65 in.

* * * * *

UNITED STATES PATENT AND TRADEMARK OFFICE
CERTIFICATE OF CORRECTION

PATENT NO. : 6,096,990  Page 1 of 1
DATED : August 1, 2000
INVENTOR(S) : Jorge Orlando Marin It is certified that error appears in the above-identified patent and that said Letters Patent is hereby corrected as shown below:

Column 1,
Line 45, "in" should be -- end --.
Line 46, "bin" should be -- bend --.
Line 48, "in" should be -- end --.

Column 2,
Line 19, should read -- stopped. When the operator releases, the process is reversed and the circuit is opened. --.
Line 61, "and" should be -- said --.

Signed and Sealed this

Twenty-fifth Day of December, 2001

Attest:

*Attesting Officer*

JAMES E. ROGAN
*Director of the United States Patent and Trademark Office*